US010041792B2

(12) United States Patent
Van Schoyck et al.

(10) Patent No.: US 10,041,792 B2
(45) Date of Patent: Aug. 7, 2018

(54) PRESSURE TAP STRUCTURES FOR BAROMETRIC ALTIMETERS FOR UNMANNED AERIAL VEHICLES

(71) Applicant: QUALCOMM Incorporated, San Diego, CA (US)

(72) Inventors: Travis Van Schoyck, Lafayette Hill, PA (US); Jonathan Paul Davis, Philadelphia, PA (US); Daniel Warren Mellinger, III, Philadelphia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 15/210,187

(22) Filed: Jul. 14, 2016

(65) Prior Publication Data

US 2017/0191829 A1    Jul. 6, 2017

Related U.S. Application Data

(60) Provisional application No. 62/273,052, filed on Dec. 30, 2015.

(51) Int. Cl.
*G01L 7/20* (2006.01)
*G01C 5/06* (2006.01)
(Continued)

(52) U.S. Cl.
CPC .............. *G01C 5/06* (2013.01); *B64C 39/024* (2013.01); *B64D 43/00* (2013.01); *G01C 5/005* (2013.01); *G05D 1/00* (2013.01)

(58) Field of Classification Search
CPC ........ G01C 5/06; G01C 5/005; B64C 39/024; B64D 43/00; G01L 19/0007; G01L 7/00; G05D 1/00; G01P 21/02
(Continued)

(56) References Cited

U.S. PATENT DOCUMENTS

| 5,770,794 A | 6/1998 | Davey |
| 8,135,503 B2 * | 3/2012 | Parras ................ G05D 1/0676 |
| | | 244/183 |

(Continued)

FOREIGN PATENT DOCUMENTS

| GB | 2385666 A | 8/2003 |
| WO | 2014018147 A2 | 1/2014 |

OTHER PUBLICATIONS

Anonymous: "Effects of Frame Design on Barometer Performance ( and all other non 3.3 specific AC questions)—DIY Drones," Aug. 16, 2015 (Aug. 16, 2015), XP055332579 Retrieved from the Internet: URL: http://diydrones.com/forum/topics/effects-of-frame-design-on-barometer-performance-and-all-other?id=705844:Topic:2071704&page=1#comments [retrieved on Jan. 5, 2017] the whole document, 8 pages.

(Continued)

*Primary Examiner* — Manish S Shah
*Assistant Examiner* — Nigel Plumb
(74) *Attorney, Agent, or Firm* — The Marbury Law Group, PLLC

(57) ABSTRACT

Various embodiments include a structure configured to at least partially expose a barometric altimeter of an unmanned aerial vehicle (UAV) to air pressure at a location on the UAV where there is reduced pressure perturbations caused by downwash of propellers. The structure may include a proximal portion configured to encompass a barometric altimeter of a circuit board of the UAV. The proximal portion may form at least a partial barrier between the barometric altimeter and a first ambient air pressure that is disturbed by a downwash from propellers of the UAV during flight of the UAV. The structure may also include a distal portion extending away from the barometric altimeter, with the distal portion configured to channel to the barometric altimeter a second ambient air pressure that is disturbed less than the (Continued)

first ambient air pressure by the downwash from propellers of the UAV during flight of the UAV.

27 Claims, 9 Drawing Sheets

(51) Int. Cl.
*B64D 43/00* (2006.01)
*B64C 39/02* (2006.01)
*G01C 5/00* (2006.01)
*G05D 1/00* (2006.01)

(58) Field of Classification Search
USPC .............................................. 73/384, 700, 37
See application file for complete search history.

(56) References Cited

U.S. PATENT DOCUMENTS

| | | | | |
|---|---|---|---|---|
| 8,989,924 | B2* | 3/2015 | Seydoux | A63H 27/12 |
| | | | | 244/17.13 |
| 2010/0034655 | A1* | 2/2010 | Jolly | B64C 27/001 |
| | | | | 416/145 |
| 2014/0278182 | A1* | 9/2014 | Garcia | G01B 21/045 |
| | | | | 702/95 |
| 2015/0105946 | A1* | 4/2015 | Kumar | B64C 39/024 |
| | | | | 701/3 |

OTHER PUBLICATIONS

International Search Report and Written Opinion—PCT/US2016/058325—ISA/EPO—dated Jan. 17, 2017.
Machuca J, "AC3.2rc2 Altitude Loss after Forward Flight—Google Groups," Jul. 7, 2014 (Jul. 7, 2014), XP055332635 Retrieved from the Internet: URL:https://groups.google.com/forum/#!msg/drones-discuss/61J5M50R-pw/CZIWEAbnoi4J [retrieved on Jan. 5, 2017] the whole document & David Pawlak: "static mod.jpg", Sep. 7, 2014, XP055332640, Retrieved from the Internet: URL:https://1h5.googleusercontent.com/-zzpQ7sFbiYw/VAyskCNkcFl/AAAAAAAAAHU/uLhu53ZfPq8/s1600/static+mod.jpg [retrieved on Jan. 5, 2017], 2 pages.
Benson C., "How to Make a Drone/UAV—Lesson 4: Flight Controller," RobotShop.com, May 25, 2015, p. 1.
Jerry D., "Ideal Flytrex Core 2 Mounting Location?" PhantomPilots.com, May 24, 2014, p. 1.
"Not using the APM Enclosure," ArduPilot.org, Cite Last Visited Apr. 28, 2016, p. 1.

* cited by examiner

PRESSURE TAP STRUCTURES FOR BAROMETRIC ALTIMETERS FOR UNMANNED AERIAL VEHICLES

RELATED APPLICATIONS

This application claims the benefit of priority to U.S. Provisional Patent Application 62/273,052 entitled "Pressure Tap Structures For Barometric Altimeters For Unmanned Aerial Vehicles," filed Dec. 30, 2015, the entire contents of which are incorporated herein by reference.

BACKGROUND

Unmanned aerial vehicles (UAVs) are becoming increasingly popular with many civil, commercial, and recreational uses. To reduce costs and weight, the electronics used to control UAVs are commonly integrated into a standard circuit board or chip set. Integrating avionics, flight sensors, memory, communications, and processing circuits into an integrated package simplifies UAV design while enabling standardization of avionics and control components and algorithms.

SUMMARY

Various embodiments include one or more structures for enabling barometric sensors (e.g., barometric altimeters) to be exposed to atmospheric pressure undisturbed by pressure perturbations created by propeller downwash, particularly when near a surface (e.g., the ground or a landing pad). Various embodiments include a structure having a proximal portion configured to at least partially encompass a barometric altimeter of a circuit board of the UAV. The proximal portion forms at least a partial barrier between the barometric altimeter and a first ambient air pressure that is disturbed by a downwash from propellers of the UAV during flight of the UAV. The structure also includes a distal portion extending away from the barometric altimeter configured to channel to the barometric altimeter a second ambient air pressure that is distributed less than the first air pressure by the downwash from the propellers of the UAV during flight of the UAV.

In some embodiments, the proximal portion may form an inner chamber in which the barometric altimeter is disposed. The proximal portion may include an aperture extending from outside the proximal portion into the inner chamber. The distal portion may include a tube having a first tube end that may be coupled to the aperture end, and a second tube end that may include an opening exposed to the second ambient air pressure. In some embodiments, the opening at the second tube end may include two or more openings each disposed along different branches of the distal portion with the two or more openings configured to expose an inside of the tube to the second ambient air pressure. In some embodiments, the proximal portion may include a gasket forming a gas seal between the circuit board and the distal portion (i.e., when the UAV is assembled).

In some embodiments, the proximal portion and the distal portion may together form a rigid chimney-like structure having a first chimney end and a second chimney end. The rigid chimney-like structure may be coupled to or form part of a housing of the UAV. The second chimney end may include an opening exposed to the second ambient air pressure. In some embodiments, the proximal portion may include a gasket forming a seal between the circuit board and the first chimney end. In some embodiments, the second chimney end may include two or more openings each disposed along different branches of the second chimney end, with the two or more openings configured to expose an inside of the rigid chimney-like structure to the second ambient air pressure. In some embodiments, the distal portion may extend to an elevation on the UAV that near or at a plane of propellers of the UAV.

In some embodiments, the structure may include a standpipe coupled to or forming part of a housing of the UAV. The standpipe may include a first standpipe end and a second standpipe end. The distal portion may include a tube having a first tube end and a second tube end. The first standpipe end may be coupled to the proximal portion. The first tube end may be fitted to and sealed with the second standpipe end. The second tube end may expose an inside of the tube to the second ambient air pressure. In some embodiments, at least one of the standpipe and the tube may be branched leading to two or more separate openings configured to expose an inside of the standpipe to the second ambient air pressure.

In some embodiments, the structure may further include a remote chamber separate from the proximal portion. The remote chamber may include one or more vents exposing the remote chamber to the second ambient air pressure. The distal portion may channel the second ambient air pressure from the remote chamber to the proximal portion.

In some embodiments, the structure may be integrated in and/or on a UAV. Such a UAV may include a circuit board, a barometric altimeter coupled to the circuit board, and the structure.

Various embodiments include a method of manufacturing the one or more structures, for use in a UAV, summarized above. The one or more structures may enable barometric sensors to be exposed to atmospheric pressure undisturbed by pressure perturbations created by propeller downwash, particularly when near a surface.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
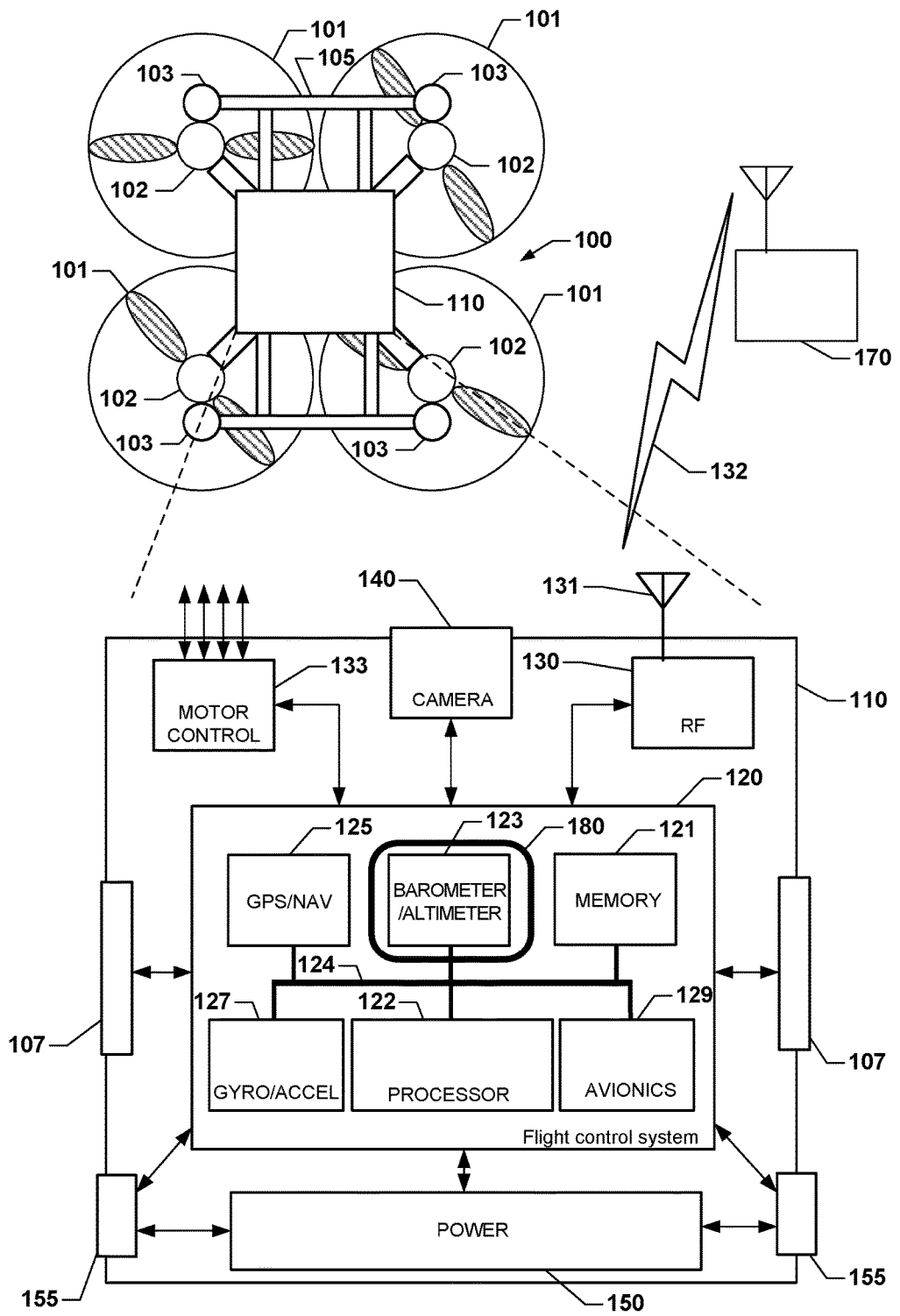
FIG. 1 is a diagram illustrating electrical and electronic components of a UAV suitable for use in the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "unmanned aerial vehicle" and "UAV" are used herein to refer to one of various types of aerial vehicles that may not utilize onboard human pilots. A UAV may include an onboard computing device configured to operate the UAV without remote operating instructions (i.e., autonomously), such as from a human operator or remote computing device. Alternatively, the onboard computing device may be configured to operate the UAV with remote operating instruction or updates to instructions stored in a memory of the onboard computing device. The UAV may be propelled by one or more propellers that provide propulsion or lifting forces for the UAV. The UAV may be powered by one or more types of power source, such as electrical, chemical, electro-chemical, or other power reserve, which may power the propulsion units, the onboard computing device, and/or other onboard components.

Various embodiments provide structures that expose a barometric altimeter (or similar means for measuring altitude based upon ambient air pressure) positioned on an integrated flight control circuit board to external ambient air pressure at a location on a UAV where the ambient air pressure is not disturbed by the downwash from propellers of the UAV during flight, particularly when flying close to a surface (e.g., when landing or taking off).

UAVs that rely on propellers for lift, such as quad-copters and multi-rotor-copters, may experience a pressure increase beneath the rotors when the UAV is near a surface, such as while landing or taking off. Specifically, when the UAV is near a surface beneath the vehicle, the downwash from the propellers can become compressed in the space between the UAV and the surface resulting in a pressure perturbation not observed during flight at altitude. The pressure perturbation tends to build the closer the UAV is to the surface (e.g., the ground or a landing surface). In addition, this pressure perturbation may be exacerbated if there are sidewalls near the surface.

The pressure perturbation from the downwash of the propellers when near a surface can create control problems, particularly while landing (or taking off). UAVs may operate in a "pressure mode" in which the UAV avionics monitor outputs of a barometric altimeter and adjust power applied to the rotor motors accordingly. While landing and operating in the pressure mode, outputs of a barometric altimeter may be used to adjust power applied to the rotor motors in order to control the rate of descent. If the barometric altimeter is measuring air pressure underneath the UAV or at least below the plane of the rotors, the barometric altimeter may register a false atmospheric pressure made higher by the compression of the downwash from the propellers near the surface. This elevated pressure may be interpreted as a lower-than-actual altitude, a false increase in descent rate, or both by a processor within an integrated avionics/flight control system. In response to this false atmospheric pressure measurement, the flight control system may increase the power applied to the rotor motors in an attempt to slow the rate of descent and/or increase altitude when such adjustments are unnecessary. This may cause the UAV to fly upward, appearing as a bounce, shortly before landing. Then, as the UAV's altitude increases, the pressure perturbation decreases as the propeller downwash is able to dissipate beneath the UAV. In response, the flight control system may respond by decreasing the power applied to the rotor motors to increase the rate of descent and continue the landing procedure. This cycle of the UAV descending and then bouncing up just before landing may continue a number of times before landing is accomplished. A similar effect on flight controls may occur during takeoff or while flying near a surface for similar reasons.

One solution to this problem would be to position the barometric altimeter at a location on the UAV that is not affected (or is less affected) by the pressure perturbation caused by the rotor downwash. However, this solution may require separating the barometric altimeter from an integrated flight control circuit board, or positioning the integrated flight control circuit board on the UAV based on the pressure perturbations, neither of which is desirable. Separating the barometric altimeter from the integrated flight control circuit board may increase weight, costs, and complexity of the UAV because the barometric altimeter is treated as a separate component. Positioning the integrated flight control circuit board on the UAV to avoid pressure perturbations may require locating the circuit board where the components may be subject to damage, moisture, or vibration from the motors or propellers, may interfere with camera or sensor placement on the UAV frame, and/or require extra weight for cables and cable routing because the components are positioned a distance from a power source.

Various embodiments address the control problems that may be caused by pressure perturbations due to propeller downwash compressed or reflected off a nearby surface by providing a structure that expose the barometric altimeter to air pressure at one or more remote locations on the UAV removed from a circuit board of the integrated flight control system where the downwash from the propellers does not disturb the ambient air pressure.

In various embodiments, the structure may be a unitary part or may include one or more pieces coupled together to form the structure. Thus, the term "structure" is intended to include structures made up of a plurality of pieces.

In various embodiments, the structure may include a proximal portion and a distal portion. The proximal portion of the structure may be configured to encompass the barometric altimeter mounted on the circuit board so as to form a barrier between the barometric altimeter and air pressure in the vicinity of the barometric altimeter (sometimes referred to herein as a "first ambient pressure"). The distal portion of the structure may be configured to fluidically couple the barometric altimeter to ambient air pressure that is not disturbed (or disturbed at a minimum) by the downwash from the propellers of the UAV during the various flight conditions (sometimes referred to herein as a "second ambient pressure").

In various embodiments, the proximal portion of the structure may include an altimeter housing that forms an inner chamber within which the barometric altimeter is disposed. The altimeter housing may include an aperture extending from outside the proximal portion into the inner chamber. Such an aperture may include a protruding flange, nipple, or similar structure for mating with and/or receiving one end of another piece of the structure that includes the distal portion of the structure. The proximal portion of the structure may comprise a gasket or similar structure configured to form a gas seal between the circuit board and the structure when the UAV is assembled.

In various embodiments, the distal portion of the structure may include a long hollow tube, channel, or hose-like piece (referred to herein as a "tube" for simplicity of reference). The tube may be flexible, semi-flexible, rigid, or a combination thereof and may have virtually any cross-sectional shape. A first end of the tube (i.e., a first tube end) may be secured in close proximity to the barometric altimeter. Additionally or alternatively, the first tube end may be coupled to an aperture in the proximal portion of the structure. A second end of the tube (i.e., a "second tube end") may include an opening that is positioned on the UAV exposed to ambient air pressure at or near a plane of the rotors (i.e., the second ambient air pressure). In some embodiments, the tube may be branched such that the second tube end includes two or more openings that expose an inside of the tube to the second ambient air pressure. In some embodiments, the distal portion of the structure extends to an elevation on the UAV that reaches, nearly reaches, or extends beyond a plane of the UAV propellers (i.e., the plane in which one or more of the propellers rotate).

In some embodiments, the distal portion of the structure may be integrated into or be made a part of a housing of the UAV as a rigid or semi-rigid channel, pipe, or tube (referred to herein as a "chimney-like structure" for ease of reference). The chimney-like structure may be positioned and configured to couple to the UAV integrated flight control circuit board around the barometric altimeter at a first chimney end. In such embodiments, the chimney-like structure may include a second chimney end positioned on the housing of the UAV so as to provide an air passage between the barometric altimeter and a location on the UAV where pressure perturbations from the downwash of the propellers are reduced and/or eliminated (i.e., the second ambient pressure). In some embodiments, the chimney-like structure may have a branched structure providing two or more openings exposing an inside of the rigid chimney-like structure to the second ambient air pressure.

Various embodiments may include an additional channeling structure (referred to herein as a "standpipe") configured to communicate air between the inside of the proximal and distal portions of the structure. A first end of the standpipe (i.e., a first standpipe end) may be coupled to the proximal portion of the structure while a second end of the standpipe (i.e., a second standpipe end) may be coupled to the distal portion of the structure. So configured, the standpipe communicates air pressure between the distal portion exposed to the second ambient air pressure and the proximal portion of the structure encompassing the barometric altimeter. The standpipe may be rigid, semi-rigid, flexible, semi-flexible, or a combination thereof. In some embodiments, the standpipe structure may be coupled to or form part of a housing of the UAV. In some embodiments, the standpipe structure may have a branched configuration providing two or more openings exposing an inside of the standpipe structure to the second ambient air pressure.

In some embodiments, the structure may include a remote chamber separate from the proximal portion of the structure and coupled to a remote side of the distal portion of the structure. The remote chamber may be formed by an external housing that includes one or more vents exposing the remote chamber to ambient air pressure at a location on the UAV where air pressure is not disturbed by the downwash from the propellers of the UAV during flight of the UAV (i.e., the second ambient air pressure). The remote chamber piece of the structure may be configured to channel air pressure from the one or more vents to the proximal portion of the structure via the distal portion of the structure. The external housing forming the remote chamber may be rigid, semi-rigid, semi-flexible, flexible, or a combination thereof and may have virtually any shape. In some embodiments, the external housing forming the remote chamber may be coupled to or form part of a housing of the UAV.

Various embodiments may be utilized with any of a wide variety of UAVs having any number of propulsion sources. A common UAV configuration suitable for use in the various embodiments is a "quad copter" configuration. In an example quad copter configuration, four horizontally-configured rotary lift propellers and motors fixed to a frame. A quad copter UAV configuration is used for illustrative purposes in the examples described herein; however, UAVs may have any number of rotary lift propellers and motors fixed to the frame. The frame may include a frame structure with landing skids that supports the propulsion motors, power source (e.g., battery), payload securing mechanism, and so on. A payload may be attached in a central area underneath the frame structure platform of the UAV, such as an area enclosed by the frame structure and skids underneath the power sources or propulsion units. A quad copter-style horizontal rotor UAV may travel in any unobstructed horizontal and vertical direction or may hover in one place.

FIG. 1 illustrates a UAV 100 in accordance with various embodiments. With reference to FIG. 1, the UAV 100 includes four horizontally configured propulsion sources in the form of propellers 101, providing rotary lift, and propulsion motors 102 fixed to a frame 105. The frame 105 may support a housing 110 for components or equipment, landing struts 103 and the propulsion motors 102, a power unit 150 (e.g., a battery), payload securing mechanism (payload securing mechanism 107), and so on.

Components within the housing 110 of the UAV 100 may include a circuit board 120 (e.g., controlling a flight control system), a radio frequency (RF) transceiver 130, a camera 140 or other sensor or payload, and the power unit 150. The circuit board 120 may include or be coupled to a memory 121 and a global positioning system (GPS) receiver and/or navigation unit 125. The circuit board 120 may include one or more processors 122 that may be configured with processor-executable instructions to control flight and other operations of the UAV 100. The circuit board 120 may further include a barometric altimeter 123, a gyroscope and/or accelerometer ("gyro/accelerometer") 127, and an avionics component 129. In some embodiments, the circuit board 120 may be configured as an integrated flight control circuit board including one or more communication busses 124 coupling the processor(s) 122 to memory 121, the barometric altimeter 123, the GPS and/or navigation unit 125, the gyroscope and/or accelerometer 127, and the avionics component 129.

In some embodiments, the circuit board 120 may be coupled to a payload securing mechanism 107 and landing sensors 155. The circuit board 120 may be powered from the power unit 150.

The processor 122 of the circuit board 120 may be coupled to a motor control unit 133 that is configured to manage the power applied to each of the propulsion motors 102 that drive the propellers 101. The processor 122 may be configured with processor-executable instructions to control of the power applied to each of the propulsion motors 102 to adjust the thrust produced by each of the propellers 101 so as to control flight attitude, altitude, and speed. The processor 122 may receive position information in three dimensions (e.g., latitude, longitude, and altitude) from the navigation unit 125, and use such data to determine the present position, altitude, and orientation of the UAV 100, as well as the appropriate course towards a destination.

The processor 122 of the circuit board 120 may be coupled to and configured to use information from the barometric altimeter 123 for determining altitude. The barometric altimeter 123 may be an integrated sensor that measures atmospheric pressure, essentially a barometer, and outputs a signal that indicates or is proportional to the measured atmospheric pressure. In some embodiments, the barometric altimeter 123 may include a circuit that converts atmospheric pressure to altitude, in which case the output signal may indicate or be proportional to altitude determined based upon atmospheric pressure. For ease of description, the term barometric altimeter is used to refer generally to any of a barometer, a pressure sensor, and/or an altimeter that is coupled to the processor 122 and the output signals of which are used for determining altitude or a rate of climb or descent in some operating modes. In particular, the processor 122 may be configured with processor-executable instructions to perform certain maneuvers, such as maintaining level flight, takeoff and landing in a barometer mode in which outputs from the barometric altimeter (e.g., 1 to 3) are used as the primary input for determining altitude (versus GPS for example).

In some embodiments, the navigation unit 125 may include any of a variety of global navigation satellite system (GNSS) receivers (e.g., a GPS receiver) enabling the UAV 100 to navigate using GNSS signals. Alternatively or in addition, the navigation unit 125 may be equipped with radio navigation receivers for receiving navigation beacon or other signals from radio nodes, such as navigation beacons (e.g., very high frequency (VHF) omnidirectional range (VOR) beacons), Wi-Fi access points, cellular network sites, radio station, etc. In some embodiments, the UAV 100 may use an alternate source of positioning signals (i.e., other than GNSS, GPS, etc.). Because UAVs often fly at low altitudes (e.g., below 400 feet), the UAV may use the RF transceiver 130 coupled to an antenna 131 to scan for local radio signals (e.g., Wi-Fi signals, Bluetooth signals, Cellular signals, etc.) associated with various transmitters, such as beacons, Wi-Fi access points, Bluetooth beacons, small cells (e.g., picocells or femtocells), etc. Upon identifying transmitters having known locations, the processor 122, or a processor within the navigation unit 125, may determine the position of the UAV 100 using trilateration based on received signal strength and the known locations of three or more transmitters. The processor 122 or a processor within the navigation unit 125 may also use additional information (e.g., dead reckoning in combination with last trusted GNSS location, dead reckoning in combination with a position of the UAV takeoff zone, etc.) for positioning and navigation. Thus, in some embodiments the UAV 100 may navigate using a combination of navigation techniques, including dead-reckoning, camera-based recognition of the land features below the UAV 100 (e.g., recognizing a road, landmarks, highway signage, etc.), etc. that may be used instead of or in combination with GNSS location determination and triangulation or trilateration based on known locations of detected wireless access points.

An avionics component 129 coupled to the processor 122 may be configured to provide flight control-related information such as attitude, airspeed, climb and sink rates, etc. that the processor 122 may use in determining how to control the propulsion motors 102. The avionics component 129 may receive data from the barometric altimeter 123 and the gyroscope and/or accelerometer 127, such as via the one or more communication busses 124. The avionics component 129 may use such information to determine orientation, attitude, rotation rates, climb and sink rates, altitude and accelerations of the UAV 100 that may be used to determine how the propulsion motors 102 should be controlled. In some embodiments, the avionics component 129 may be included within the processor 122, such as in executable software instructions or in dedicated circuitry coupled to a programmable processor.

The circuit board 120 and/or the processor 122 may be configured to communicate with an external control system 170, such as a server, a beacon, smartphone, tablet, or other computing device through a wireless connection 132 (e.g., a cellular data network) via the RF transceiver 130. An external control system 170 may provide flight plans, direct flight control instructions, navigation data, and other assistance that may be used by the processor 122 to perform a flight plan.

While the various components within the housing 110 are illustrated in FIG. 1 as separate components, some or all of the components (e.g., the circuit board 120, the motor control unit 133, the RF transceiver 130, and other units) may be integrated together in a single device or unit, such as a system-on-chip.

Various embodiments include a structure 180 that at least partially or fully encompasses the barometric altimeter 123. The structure 180 may form at least a partial barrier (or full barrier in some embodiments) between the barometric altimeter 123 and ambient air pressure (i.e., a first ambient air pressure) at a location on the UAV where air pressure can be disturbed by a downwash from propellers 101 of the UAV 100 during flight. The structure 180 may be any structural elements that encompass the barometric altimeter 123, extend away from the barometric altimeter 123, and are configured to channel unperturbed ambient air pressure from a location on the UAV where air pressure is not (or is less) disturbed by the propeller downwash (i.e., a second ambient air pressure) to proximal portion of the structure encompassing the barometric altimeter 123. Thus, the structure 180 exposes the barometric altimeter 123 to undisturbed ambient air pressure (i.e., a second ambient air pressure) during flight.

Figure 2:
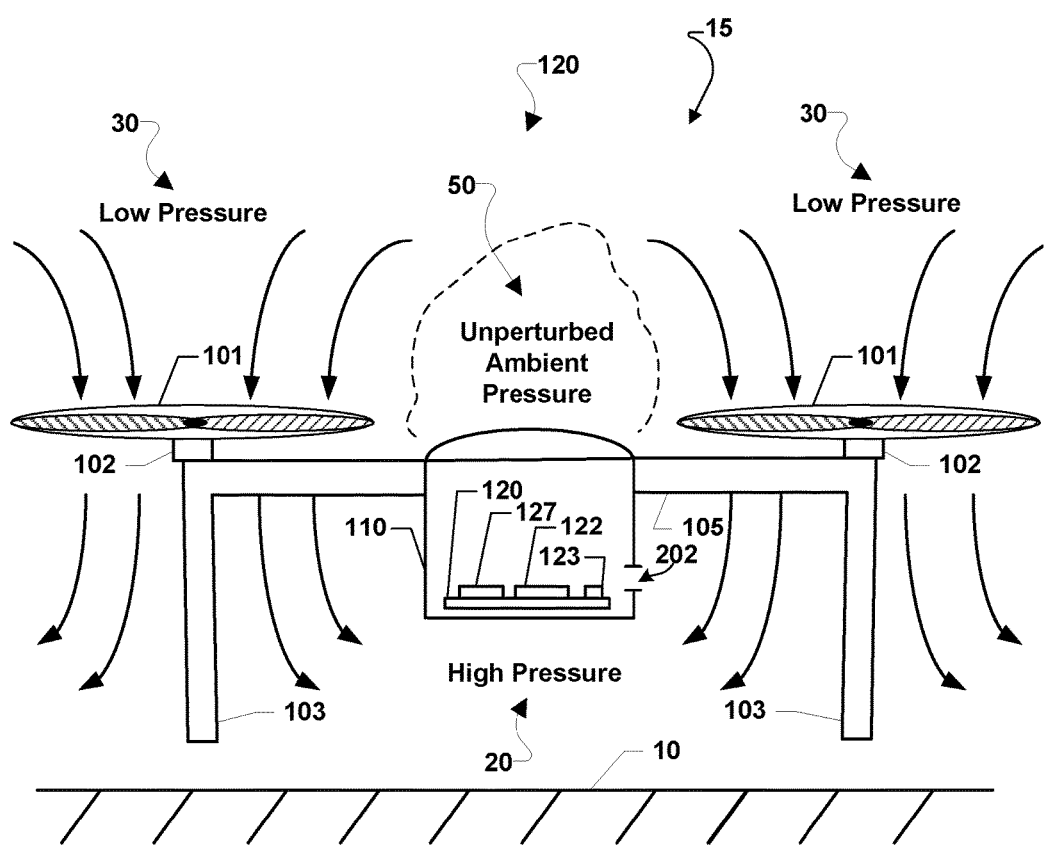
FIG. 2 is a schematic side elevation view of a conventional UAV near a landing surface illustrating how pressure perturbations created by the propellers can affect a barometric altimeter.

FIG. 2 illustrates the problem that may arise in conventional UAV systems that may be addressed by various embodiments. In particular, when the conventional UAV 15 is near a surface 10, such as a landing pad, the ground, a building, etc., downwash (illustrated in solid arrows) from the propellers 101 builds up in the volume between the propellers 101 and the surface 10. This effect results in a zone beneath the propellers 101 of high pressure 20 relative to ambient air pressure. This effect perturbing pressure around the vehicle may not be observed at normal flight altitudes because the downwash from the propellers extends away from the conventional UAV 15.

In the conventional UAV 15, the barometric altimeter 123 on the circuit board 120 will be exposed to the high pressure 20 via vents 202 within the housing 110 when the conventional UAV 15 is near the surface 10, such as during takeoff and landing. Such vents 202 may be specific structures within the housing 110 provided to ensure the housing is not pressurized during flight to altitude or the result of seams and openings in the housing structure. Exposing the barometric altimeter 123 to the high pressure 20 created by the propellers 101 when close to the surface 10 may result in a false, specifically lower, altitude determination by the barometric altimeter 123. False altitude determinations may prompt the flight control system on the circuit board 120 to increase power to the propulsion motors 102 when flight controls are using signals from the barometric altimeter 123 to control altitude resulting in the conventional UAV 15 climbing suddenly just before it should touch down.

FIG. 2 also illustrates that air pressure may also be disturbed above the propellers 101 where a zone of low pressure 30 (relative to unperturbed ambient air pressure) may form. FIG. 2 further illustrates that zones of unperturbed ambient air pressure 50 may exist over parts of the conventional UAV 15, such as in a region between the propellers 101 blocked from the high pressure 20 by a structure, such as the housing 110.

Figure 3A:
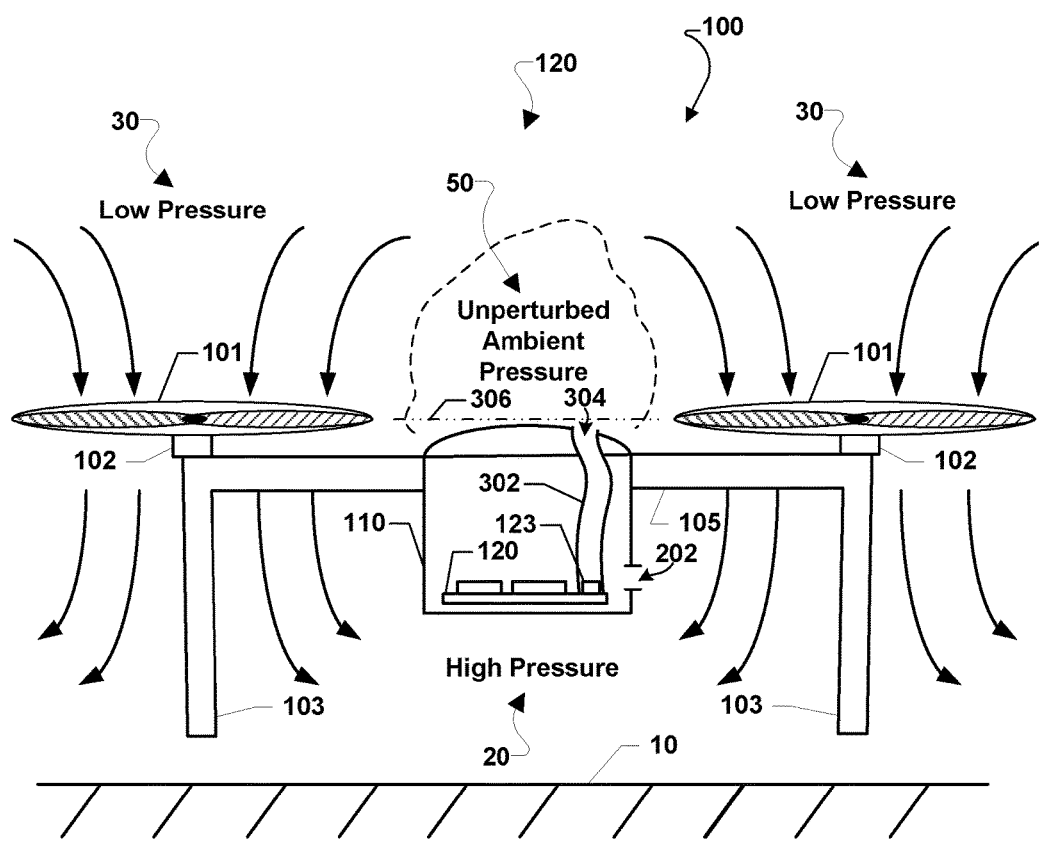
FIG. 3A is a schematic side elevation view of a UAV illustrating a flexible structure coupled to a barometric altimeter according to various embodiments.

FIG. 3A illustrates a UAV (e.g., 100) implementing some embodiments in which the barometric altimeter 123 is coupled to a zone of unperturbed ambient air pressure 50 about the UAV 100 via a structure (i.e., 180) in the form of a tube or channel 302. With reference to FIGS. 1 and 3A, in such embodiments, the tube 302 may be coupled to the circuit board 120 to form a relatively airtight seal about the barometric altimeter 123. The tube 302 exposes the barometric altimeter 123 to the unperturbed ambient air pressure 50 that exists at opening 304 at the distal end of the tube 302. By positioning the distal end of the tube 302 on the UAV 100 where the opening 304 is in a zone of the unperturbed ambient air pressure 50, the barometric altimeter 123 is less or not affected by the high pressure 20 perturbations that occur when the UAV 100 is near the surface 10. Consequently, the circuit board 120 is less likely to cause an unnecessary increase in altitude when flight controls are using signals from the barometric altimeter 123 to control altitude when the UAV 100 is near the surface 10 (e.g., a landing pad), such as during takeoff and landing maneuvers.

The tube 302 may be of a variety of tubular structures. Using a tube 302 that is flexible or semi-rigid may provide flexibility for routing the tube 302 within or outside the housing 110 and positioning the opening 304 of the distal end in a zone of the unperturbed ambient air pressure 50. This flexibility may enable the tube 302 to be repositioned after flight testing, such as to address observed issues in landing. However, other configurations (e.g., rigid tubing) may also be implemented.

The tube 302 may be sealed to the circuit board 120 using a variety of methods, including adhesives, compression fit, coupling to a gasket or sealing structure on the circuit board, etc.

The position of the opening 304 of the tube 302 may vary depending upon the configuration of the UAV 100. It is anticipated that unperturbed ambient air pressure 50 may be observed at a location that is approximately parallel to the plane of the propellers 101 (indicated by the dashed line 306). For example, FIG. 3A illustrates the tube 302 penetrating the housing 110 near a top portion that is near the plane of the propellers 101.

Figure 3B:
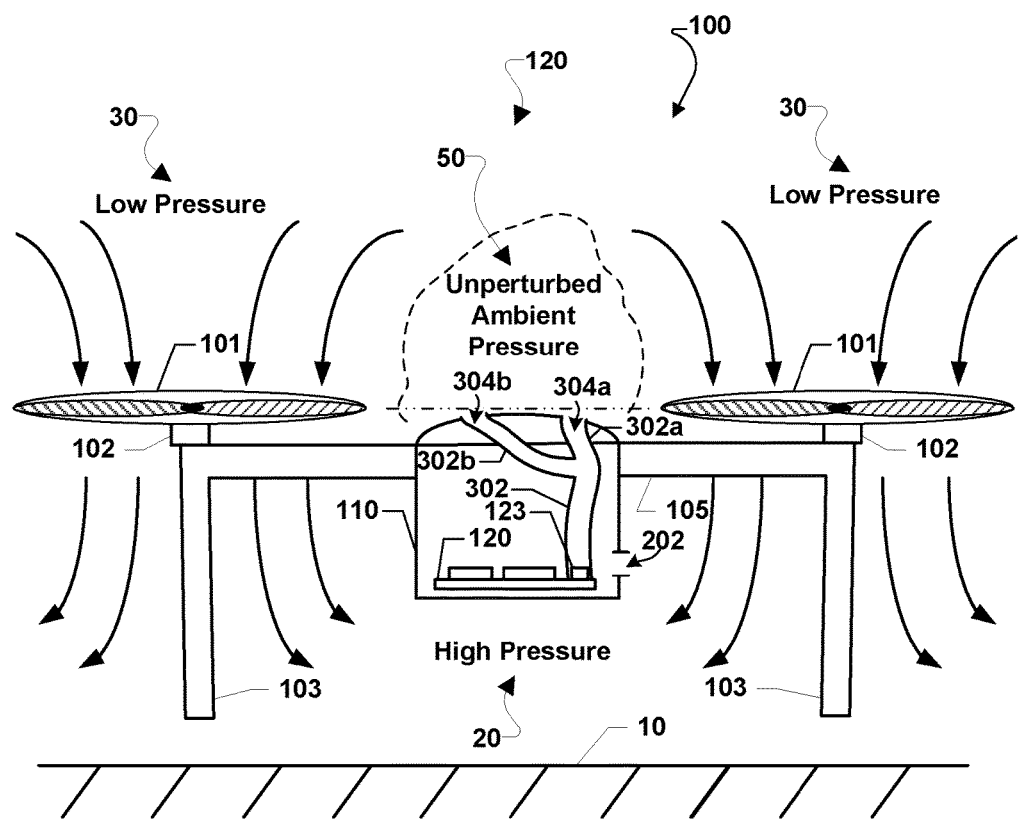
FIG. 3B is a schematic side elevation view of a UAV illustrating a branched flexible structure coupled to a barometric altimeter according to various embodiments.

FIG. 3B illustrates a UAV (e.g., 100) implementing some embodiments in which the barometric altimeter 123 is coupled to a zone of the unperturbed ambient air pressure 50 via a tube 302 that is branched to provide two or more openings 304a, 304b. With reference to FIGS. 1, 3A, and 3B, in such embodiments, the tube 302 may branch into two or more segments 302a, 302b that may be routed to different positions on the UAV 100. Providing the two or more openings 304a, 304b to the unperturbed ambient air pressure 50 may provide greater flexibility in routing and positioning the tube 302 and segments 302a, 302b, as well as helping to reduce the effects of a localized pressure perturbation near one of the openings 304a, 304b.

Figure 4A:
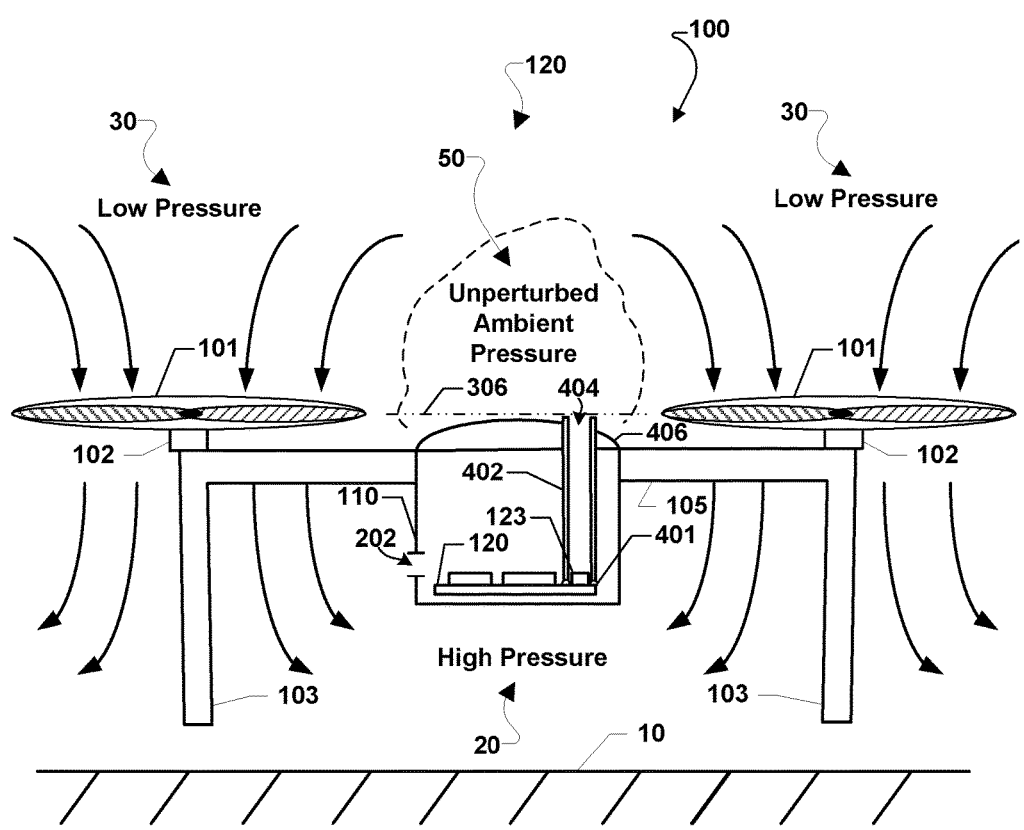
FIG. 4A is a schematic side elevation view of a UAV illustrating a rigid chimney-like structure within a UAV housing coupled to a barometric altimeter according to various embodiments.

FIG. 4A illustrates a UAV (e.g., 100) implementing some embodiments in which the barometric altimeter 123 is coupled to a zone of the unperturbed ambient air pressure 50 via a structure 180 in the form of a chimney-like structure 402 that passed between an inside and an outside of the housing 110. With reference to FIGS. 1 and 3A-4A, in such embodiments, the chimney-like structure 402 may include a proximal portion coupled to the circuit board 120 to form a relatively airtight seal about the barometric altimeter 123. The chimney-like structure 402 causes the barometric altimeter 123 to be exposed to the unperturbed ambient air pressure 50 that exists at opening 404 at the distal portion of the chimney-like structure 402. By positioning the distal portion of the chimney-like structure 402 on the UAV 100 where the opening 404 is in a zone of unperturbed ambient air pressure 50, the barometric altimeter 123 is less or not affected by the high pressure 20 perturbations that occur when the UAV 100 is near a surface 10, such as during takeoff and landing. Consequently, the flight control system on the circuit board 120 is less likely to cause an unnecessary increase in altitude when flight controls are using signals from the barometric altimeter 123 to control altitude when the UAV 100 is near the surface 10 (e.g., a landing pad), such as during takeoff and landing.

The chimney-like structure 402 may be of a variety of rigid or semi-rigid structures that may be a component of the housing 110. For example, the chimney-like structure 402 may be formed in or coupled to a cap 406 of the housing 110, such that when the UAV 100 is assembled and the cap 406 is attached, the chimney-like structure 402 fits over the barometric altimeter 123. Forming the chimney-like structure 402 as part of or coupled to the housing 110 may simplify assembly of the UAV 100 by eliminating the need to reposition a flexible tube as described with reference to FIG. 3A.

Again with reference to FIGS. 1 and 3A-4A, in various embodiments, the structure (e.g., 180) that encompasses the barometric altimeter 123 may be a single integrally formed element or formed from more than one pieces. An end of the structure 402 that is closest to the barometric altimeter 123 is referred to herein as the proximal portion and an end that extends away from the barometric altimeter 123 is referred to herein as the distal portion. However, it should be understood that the proximal portion and the distal portion may be one integral piece or separate pieces that are joined in accordance with various embodiments. For example, the chimney-like structure 402 may be considered a distal portion that may be sealed around the barometric altimeter 123 on the circuit board 120 using a proximal portion in the form of a gasket 401 and the overall structure of such embodiments includes both the chimney-like structure 402 and the gasket 401. Thus, the distal portion may be sized and shaped as needed to provide a means for channeling pressure to the barometric altimeter 123.

The gasket 401 may include a rubber sealing element, adhesives, a compression fit, or other coupling/sealing structure, or combination thereof. The gasket 401 may facilitate forming an airtight (or essentially airtight) seal with the chimney-like structure 402. For example, the gasket 401 may be configured to receive and form a seal around one end of the chimney-like structure 402 as the housing 110 is assembled (e.g., as when the cap 406 is fitted onto the housing 110). The gasket 401 may be formed from a flexible material, such as rubber or plastic, and configured so is to form a seal about a structure (e.g., a chimney-like structure 402) when that structure 402 is pressed into the gasket 401. Further details regarding a gasket 401 according to various embodiments are discussed with reference to FIGS. 6A-6C.

Figure 4B:
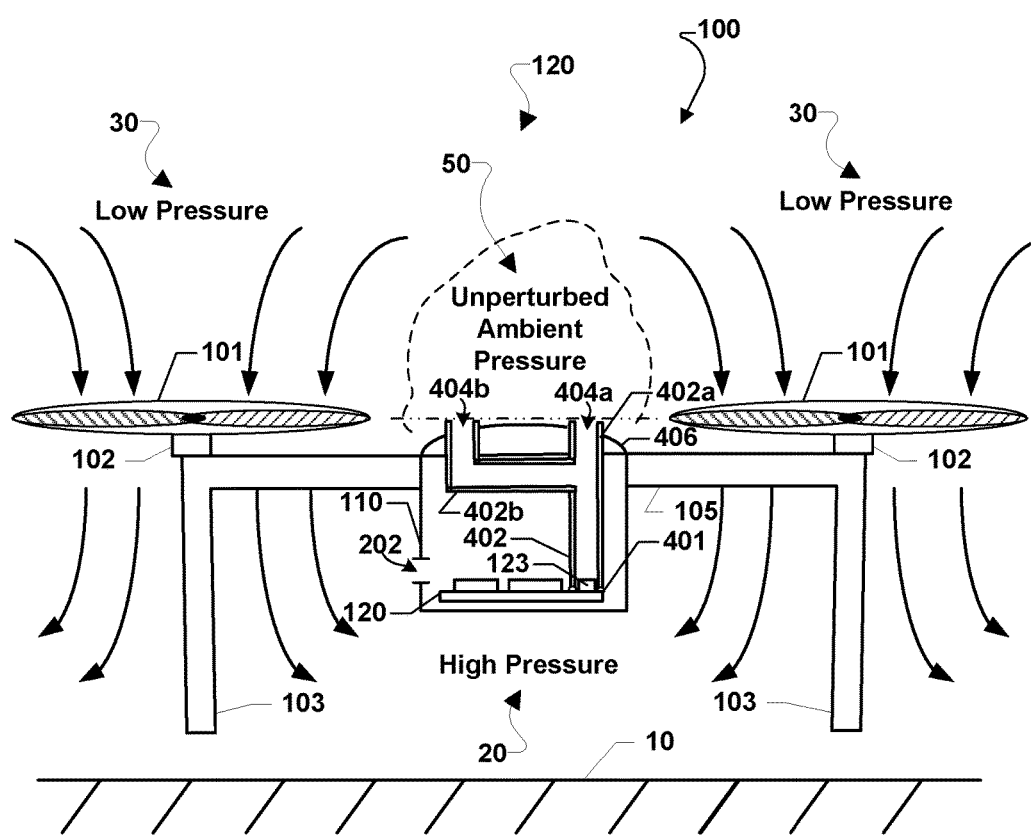
FIG. 4B is a schematic side elevation view of a UAV illustrating a branched rigid chimney-like structure within a UAV housing coupled to a barometric altimeter according to various embodiments.

FIG. 4B illustrates a UAV (e.g., 100) implementing some embodiments in which the barometric altimeter 123 is coupled to a zone of unperturbed ambient air pressure 50 via a structure (i.e., 180) in the form of the chimney-like structure 402 that is branched to provide two or more openings 404a, 404b. With reference to FIGS. 1 and 3A-4B, in such embodiments, the chimney-like structure 402 may branch into two or more segments 402a, 402b that may have openings on different locations on the UAV 100. Providing two or more openings 404a, 404b to undisturbed ambient air pressure may help to reduce the effects of a localized pressure perturbation near one opening 404a or 404b.

Figure 5:
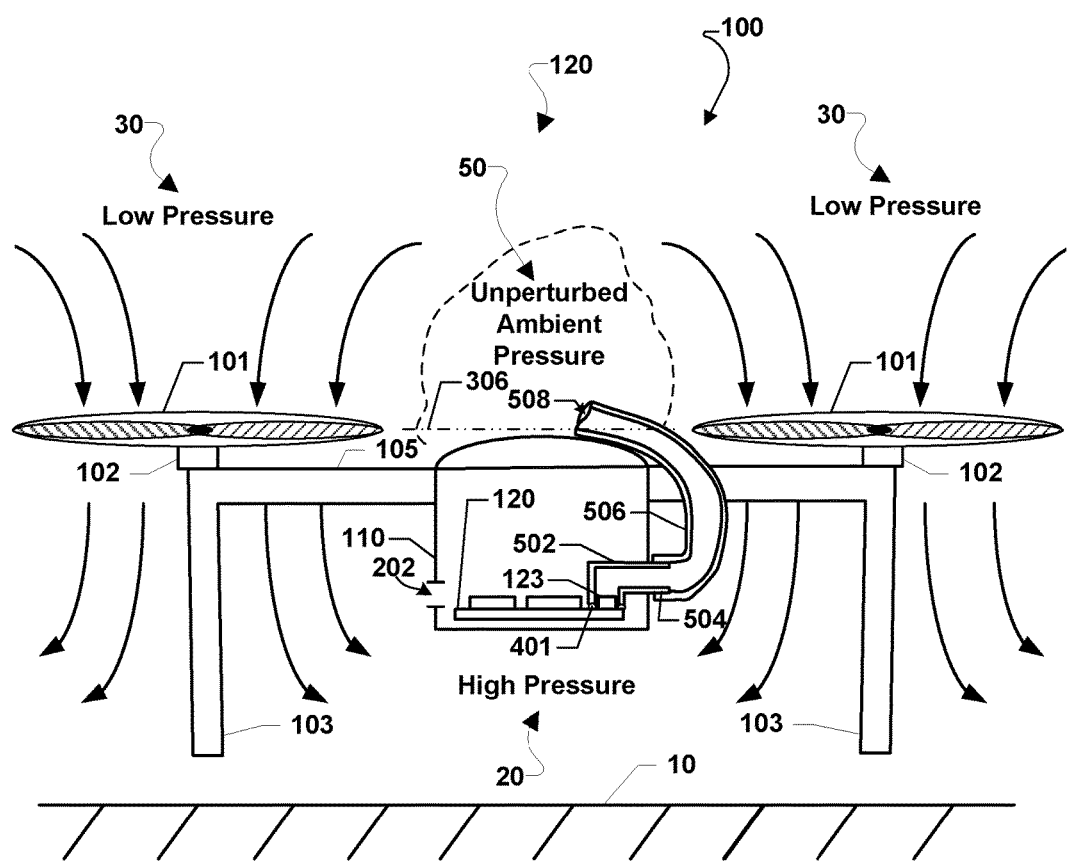
FIG. 5 is a schematic side elevation view of a UAV illustrating a standpipe structure coupling a barometric altimeter on one end to a tube on the other end according to various embodiments.

FIG. 5 illustrates some embodiments in which the barometric altimeter 123 is coupled to a zone of the unperturbed ambient air pressure 50 via a structure (e.g., 180) that is formed from a combination a tube 506 that is joined to a standpipe 502 that in-turn is coupled to the circuit board 120 by the gasket 401. With reference to FIGS. 1 and 3A-5, in such embodiments, the standpipe 502 may be coupled to or formed as part of the housing 110 and positioned so that one end (i.e., a first standpipe end) surrounds the barometric altimeter 123 on the circuit board 120 inside the housing 110. The other end (i.e., a second standpipe end) of the standpipe 502 may be configured to provide a connection point 504 (e.g., a nipple) for connecting to the tube 506 that can be positioned so that an opening 508 in the tube 506 is within a zone of the unperturbed ambient air pressure 50. For example, the standpipe 502 may be configured as an elbow joint penetrating a wall of the housing 110 at a location and with the configuration so that one end surrounds the barometric altimeter 123, sealed on the circuit board 120 by the gasket 401 when the UAV 100 is assembled.

A portion of the standpipe 502 may extend through the wall of the housing 110 to form the connection point 504. The tube 506 may be slipped over the connection point 504 forming a seal via compression and/or a sealing (or glue) compound. The tube 506 may then be routed (e.g., manually during or after assembly) so that the opening 508 is exposed to the unperturbed ambient air pressure 50.

In some embodiments, the standpipe 502 and/or the tube 506 may be branched so that multiple openings may be positioned on the UAV 100 so that the barometric altimeter 123 is exposed to the unperturbed ambient air pressure 50 from multiple locations on the UAV 100, some of which may not be perturbed by the downwash of the propellers 101. If the standpipe 502 is branched, each branch may be coupled to a separate one of the tube 506, some of which may also be branched. If the standpipe 502 is non-branched, the standpipe 502 may be coupled to the tube 506, which is branched, similar to embodiments illustrated in FIG. 3B.

Figure 6A:
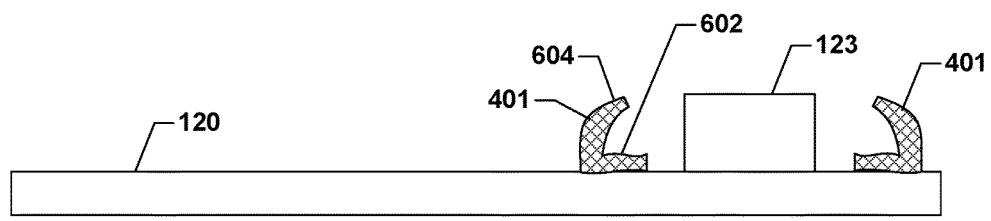
FIG. 6A is a cross-sectional view of a circuit board including a gasket encompassing a barometric altimeter according to various embodiments.

FIG. 6A illustrates an example of the gasket 401 coupled to the circuit board 120 and encompassing the barometric altimeter 123 according to some embodiments. With reference to FIGS. 1 and 3A-6A, the gasket 401 may be configured with a shape that facilitates forming a gas seal about a structure that matches the shape of the gasket. For example, the gasket 401 may include a seat portion 602 at a base of the gasket 401 and a lip portion 604 extending away from the seat portion 602. The lip portion 604 may be oriented such that when air pressure outside of the gasket 401 is greater than within a structure mounted on and sealed by the gasket 401, the difference in air pressure causes the lip portion 604 to increase the sealing force. Alternatively, other gasket and/or sealing elements may be used.

Figure 6B:
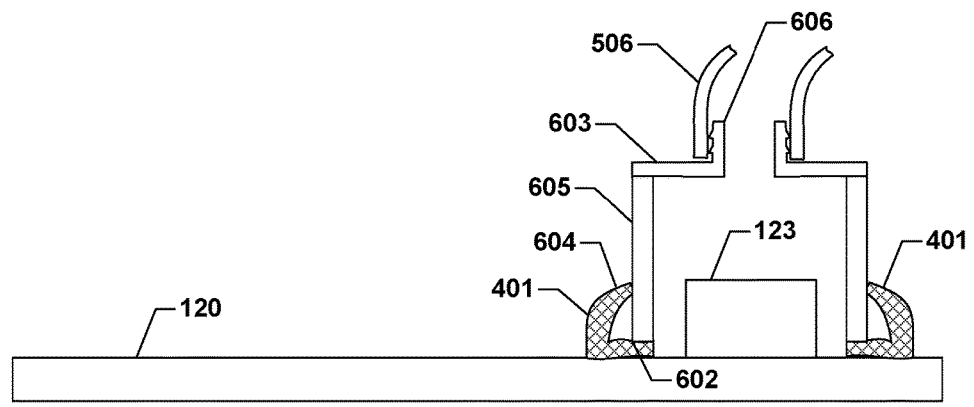
FIG. 6B is a cross-sectional view of the circuit board of FIG. 6A illustrating an inner chamber in which the barometric altimeter is disposed according various embodiments.

FIG. 6B illustrates an alternative standpipe 603 seated on the gasket 401 according to some embodiments. With reference to FIGS. 1 and 3A-6B, the alternative standpipe 603 includes a base portion 605 that contacts the seat portion 602 of the gasket 401. The lip portion 604 of the gasket 401 also seals around the exterior of the base portion 605 to form a secondary seal. The alternative standpipe 603 also includes a nipple portion 606 configured to form a seal with a tube 506.

Figure 6C:
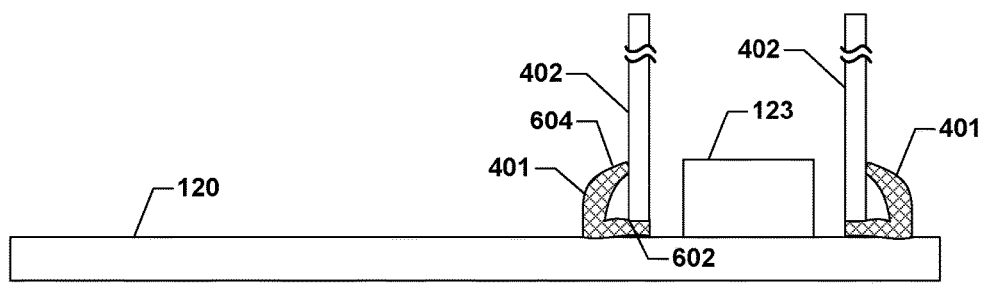
FIG. 6C is a cross-sectional view of the circuit board of FIG. 6A illustrating a rigid chimney-like structure sealed to the circuit board by the gasket according various embodiments.

FIG. 6C illustrates details of a chimney-like structure 402 encompassing the barometric altimeter 123 by mating with the gasket 401. With reference to FIGS. 1 and 3A-6C, the chimney-like structure 402 contacts the seat portion 602 of the gasket 401 to form a first seal, while the lip portion 604 of the gasket 401 seals around the exterior of the chimney-like structure 402 to form a secondary seal.

Figure 7:
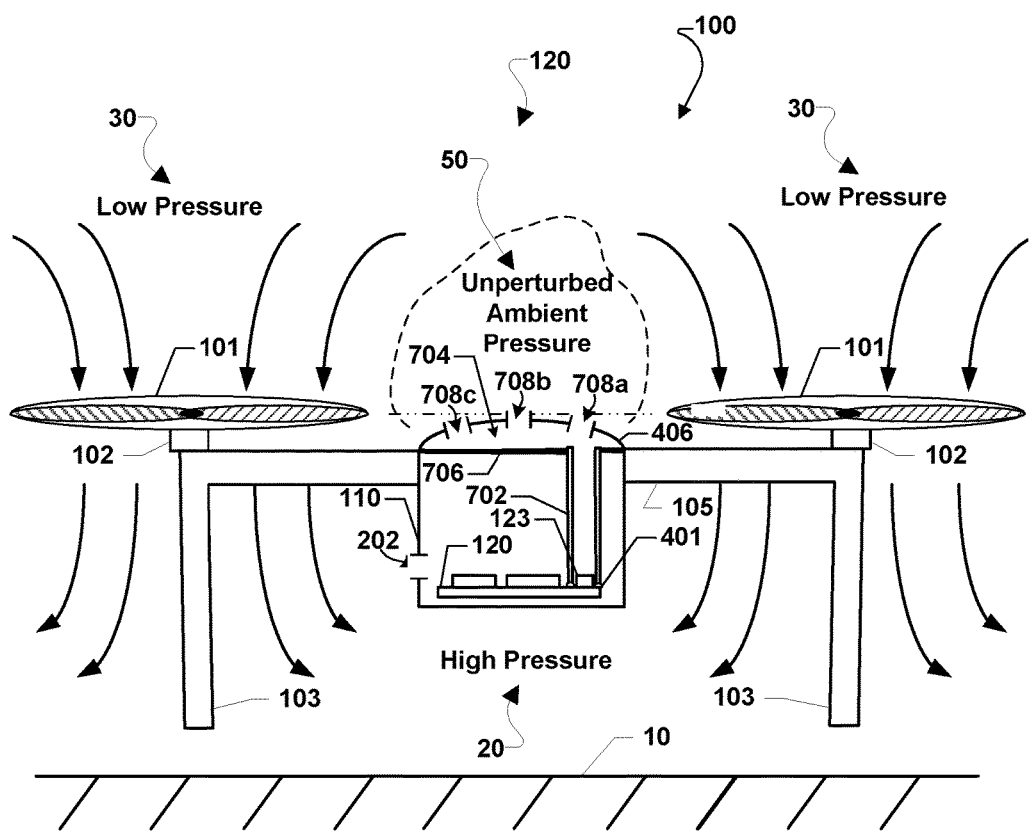
FIG. 7 is a schematic side elevation view of a UAV illustrating a remote chamber including multiple vents configured to channel ambient air pressure to a barometric altimeter according to various embodiments.

FIG. 7 illustrates a UAV 100 implementing some embodiments in which the barometric altimeter 123 is coupled to a zone of the unperturbed ambient air pressure 50 via a structure (e.g., 180) that includes a standpipe 702 that connects to a remote chamber 704 within the housing 110 that includes one or more air vents 708a, 708b, 708c. With reference to FIGS. 1 and 3A-7, the remote chamber 704 may be formed of various housing structures, such as a cap 406 and a floor piece 706, and positioned on the UAV 100 so that the one or more air vents 708a, 708b, 708c expose the remote chamber 704 to the unperturbed ambient air pressure 50. So structured, the air within the remote chamber 704 may have a pressure that is consistent with the unperturbed ambient air pressure 50.

The standpipe 702 may be coupled to the circuit board 120 to form a relatively airtight seal about the barometric altimeter 123. Thus, the standpipe 702 may in-turn expose the barometric altimeter 123 to the unperturbed ambient air pressure 50 vented into the remote chamber 704 at the distal end of the standpipe 702.

By positioning the air vents 708a, 708b, 708c of the remote chamber 704 on the UAV 100 where each is open to a zone of the unperturbed ambient air pressure 50, the barometric altimeter 123 may be only partially affected or entirely unaffected by the high pressure 20 perturbation that occurs when the UAV 100 is near a surface 10, such as during takeoff and landing. Consequently, the flight control system on the circuit board 120 is less likely to cause an unnecessary increase in altitude when flight controls are using signals from the barometric altimeter 123 to control altitude when the UAV 100 is near the surface 10 (e.g., a landing pad), such as during takeoff and landing.

The standpipe 702 may be of a variety of rigid or semi-rigid structures that may be a component of the housing 110 or of the remote chamber 704, such as rigidly coupled to the floor piece 706. For example, the standpipe 702 may be formed in or coupled to floor piece 706, such that when the remote chamber 704 is assembled on the UAV 100, the standpipe 702 fits over the barometric altimeter 123. Using a standpipe 702 that is part of or coupled to the remote chamber 704 may simplify assembly of the UAV 100.

The standpipe 702 may be sealed around the barometric altimeter 123 on the circuit board 120 using a variety of methods, including coupling to a gasket 401 or sealing structure on the circuit board as illustrated in FIG. 6C, adhesives, compression fit, etc.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "then," are not intended to limit the order of the steps; these words are simply used to guide the reader through the description of the methods. Further, any reference to claim elements in the singular, for example, using the articles "a," "an" or "the" is not to be construed as limiting the element to the singular.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A structure for use in an unmanned aerial vehicle (UAV), the structure comprising:
   a proximal portion configured to at least partially encompass a barometric altimeter of a circuit board of the UAV, wherein the proximal portion forms at least a partial barrier between the barometric altimeter and a first ambient air pressure that is disturbed by a downwash from propellers of the UAV during flight of the UAV; and
   a distal portion extending away from the barometric altimeter, wherein the distal portion channels to the barometric altimeter a second ambient air pressure that is disturbed less than the first ambient air pressure by the downwash from the propellers of the UAV during flight of the UAV, wherein the distal portion extends to an elevation on the UAV that is near or at a plane of the propellers of the UAV.

2. The structure of claim 1,
   wherein the proximal portion forms an inner chamber in which the barometric altimeter is disposed,
   wherein the proximal portion includes an aperture extending from outside the proximal portion into the inner chamber,
   wherein the distal portion comprises a tube having a first tube end and a second tube end, and
   wherein the first tube end is coupled to the aperture, and the second tube end includes an opening exposed to the second ambient air pressure.

3. The structure of claim 2,
   wherein the opening at the second tube end comprises two or more openings each disposed along different branches of the distal portion, and
   wherein the two or more openings expose an inside of the tube to the second ambient air pressure.

4. The structure of claim 1, wherein the proximal portion comprises a gasket forming a gas seal between the circuit board and the distal portion.

5. A structure for use in an unmanned aerial vehicle (UAV), the structure comprising:
   a proximal portion configured to at least partially encompass a barometric altimeter of a circuit board of the UAV, wherein the proximal portion forms at least a partial barrier between the barometric altimeter and a first ambient air pressure that is disturbed by a downwash from propellers of the UAV during flight of the UAV; and
   a distal portion extending away from the barometric altimeter, wherein the distal portion channels to the barometric altimeter a second ambient air pressure that is disturbed less than the first ambient air pressure by the downwash from the propellers of the UAV during flight of the UAV,
   wherein the proximal portion and the distal portion together form a rigid chimney-like structure having a first chimney end and a second chimney end,
   wherein the rigid chimney-like structure is coupled to or forms part of a housing of the UAV, and
   wherein the second chimney end includes an opening exposed to the second ambient air pressure.

6. The structure of claim 5, wherein the proximal portion comprises a gasket forming a seal between the circuit board and the first chimney end.

7. The structure of claim 5,
   wherein the second chimney end comprises two or more openings each disposed along different branches of the second chimney end, and
   wherein the two or more openings expose an inside of the rigid chimney-like structure to the second ambient air pressure.

8. A structure for use in an unmanned aerial vehicle (UAV), the structure comprising:
   a proximal portion configured to at least partially encompass a barometric altimeter of a circuit board of the UAV, wherein the proximal portion forms at least a partial barrier between the barometric altimeter and a first ambient air pressure that is disturbed by a downwash from propellers of the UAV during flight of the UAV;
   a distal portion extending away from the barometric altimeter, wherein the distal portion channels to the barometric altimeter a second ambient air pressure that is disturbed less than the first ambient air pressure by the downwash from the propellers of the UAV during flight of the UAV; and
   a standpipe coupled to or forming part of a housing of the UAV,
   wherein the standpipe includes a first standpipe end and a second standpipe end,
   wherein the distal portion includes a tube having a first tube end and a second tube end,
   wherein the first standpipe end is coupled to the proximal portion, wherein the first tube end is fitted to and sealed with the second standpipe end, and wherein the second tube end exposes an inside of the tube to the second ambient air pressure.

9. The structure of claim 8, wherein at least one of the standpipe and the tube are branched leading to two or more separate openings, and wherein the two or more separate openings expose an inside of the standpipe to the second ambient air pressure.

10. A structure for use in an unmanned aerial vehicle (UAV), the structure comprising:

a proximal portion configured to at least partially encompass a barometric altimeter of a circuit board of the UAV, wherein the proximal portion forms at least a partial barrier between the barometric altimeter and a first ambient air pressure that is disturbed by a downwash from propellers of the UAV during flight of the UAV;

a distal portion extending away from the barometric altimeter, wherein the distal portion channels to the barometric altimeter a second ambient air pressure that is disturbed less than the first ambient air pressure by the downwash from the propellers of the UAV during flight of the UAV; and a remote chamber separate from the proximal portion, wherein the remote chamber includes one or more vents exposing the remote chamber to the second ambient air pressure, and wherein the distal portion channels the second ambient air pressure from the remote chamber to the proximal portion.

11. An unmanned aerial vehicle (UAV), comprising:
a circuit board;
a barometric altimeter coupled to the circuit board; and
a structure comprising:
  a proximal portion configured to at least partially encompass the barometric altimeter of the circuit board, wherein the proximal portion forms at least a partial barrier between the barometric altimeter and a first ambient air pressure that is disturbed by a downwash from propellers of the UAV during flight of the UAV; and
  a distal portion extending away from the barometric altimeter, wherein the distal portion fluidically couples the barometric altimeter to a second ambient air pressure that is disturbed less than the first ambient air pressure by the downwash from the propellers of the UAV during flight of the UAV, wherein the distal portion extends to an elevation on the UAV that is near or at a plane of the propellers of the UAV.

12. The UAV of claim 11, wherein the proximal portion forms an inner chamber in which the barometric altimeter is disposed, wherein the proximal portion includes an aperture extending from outside the proximal portion into the inner chamber, wherein the distal portion comprises a tube having a first tube end and a second tube end, and wherein the first tube end is coupled to the aperture and the second tube end includes an opening exposed to the second ambient air pressure.

13. The UAV of claim 12, wherein the opening at the second tube end comprises two or more openings each disposed along different branches of the distal portion, and wherein the two or more openings expose an inside of the tube to the second ambient air pressure.

14. The UAV of claim 11, wherein the proximal portion comprises a gasket forming a gas seal between the circuit board and the distal portion.

15. The UAV of claim 11, wherein the proximal portion and the distal portion together form a rigid chimney-like structure having a first chimney end and a second chimney end, wherein the rigid chimney-like structure is coupled to or forms part of a housing of the UAV, and wherein the second chimney end includes an opening exposed to the second ambient air pressure.

16. The UAV of claim 15, wherein the proximal portion comprises a gasket forming a seal between the circuit board and the first chimney end.

17. The UAV of claim 15, wherein the second chimney end comprises two or more openings each disposed along different branches of the second chimney end, and wherein the two or more openings expose an inside of the rigid chimney-like structure to the second ambient air pressure.

18. The UAV of claim 11, further comprising:
a standpipe coupled to or forming part of a housing of the UAV, wherein the standpipe includes a first standpipe end and a second standpipe end, wherein the distal portion includes a tube having a first tube end and a second tube end, wherein the first standpipe end is coupled to the proximal portion, wherein the first tube end is fitted to and sealed with the second standpipe end, wherein the second tube end exposes an inside of the tube to the second ambient air pressure.

19. The UAV of claim 18, wherein at least one of the standpipe and the tube are branched leading to two or more separate openings, and wherein the two or more separate openings expose an inside of the standpipe to the second ambient air pressure.

20. The UAV of claim 11, further comprising:
a remote chamber separate from the proximal portion, wherein the remote chamber includes one or more vents exposing the remote chamber to the second ambient air pressure, and wherein the distal portion channels the second ambient air pressure from the remote chamber to the proximal portion.

21. A structure for use on an unmanned aerial vehicle (UAV), comprising:
means for at least partially encompassing a barometric altimeter of a circuit board of the UAV to form at least a partial barrier between the barometric altimeter and a first ambient air pressure that is not disturbed by a downwash from propellers of the UAV during flight of the UAV; and
means for channeling to the barometric altimeter a second ambient air pressure that is disturbed less than the first ambient air pressure by the downwash from the propellers of the UAV during flight of the UAV, wherein means for channeling to the barometric altimeter the second ambient air pressure extends to an elevation on the UAV that is near or at a plane of the propellers of the UAV.

22. A method of manufacturing a structure for use in an unmanned aerial vehicle (UAV), the method comprising:
configuring a proximal portion to partially encompass a barometric altimeter of a circuit board of the UAV, wherein the proximal portion is configured to form at least a partial barrier between the barometric altimeter and a first ambient air pressure that is disturbed by a downwash from propellers of the UAV during flight of the UAV;
providing a distal portion extending away from the barometric altimeter, wherein the distal portion is configured to channel to the barometric altimeter a second ambient air pressure that is disturbed less than the first ambient air pressure by the downwash from the propellers of the UAV during flight of the UAV; and configuring the distal portion to extend to an elevation on the UAV that is near or at a plane of propellers of the UAV.

23. The method of claim 22, further comprising:

configuring the proximal portion to form an inner chamber in which the barometric altimeter is disposed;

configuring the proximal portion to include an aperture extending from outside the proximal portion into the inner chamber; and configuring the distal portion to include a tube having a first tube end and a second tube end, wherein the first tube end is coupled to the aperture, and the second tube end includes an opening exposed to the second ambient air pressure.

24. The method of claim 22, further comprising:

configuring the proximal portion and the distal portion to form a rigid chimney-like structure having a first chimney end and a second chimney end, wherein the rigid chimney-like structure is coupled to or forms part of a housing of the UAV, and wherein the second chimney end includes an opening exposed to the second ambient air pressure.

25. The method of claim 22, further comprising:

forming part of a housing of the UAV or coupling thereto with a standpipe, wherein the standpipe includes a first standpipe end and a second standpipe end;

configuring the distal portion to include a tube having a first tube end and a second tube end;

coupling the first standpipe end to the proximal portion;

fitting the first tube end to and sealing the first tube end with the second standpipe end; and configuring the second tube end to expose an inside of the tube to the second ambient air pressure.

26. The method of claim 25, further comprising:

forming a branch in at least one of the standpipe and the tube, wherein the branch leads to two or more separate openings, and wherein the two or more separate openings expose an inside of the standpipe to the second ambient air pressure.

27. The method of claim 22, further comprising:

forming a remote chamber separate from the proximal portion, wherein the remote chamber is formed to include one or more vents exposing the remote chamber to the second ambient air pressure; and configuring the distal portion to channel the second ambient air pressure from the remote chamber to the proximal portion.

* * * * *